Aug. 2, 1966   J. M. PATTERSON   3,263,360
POWDERED MATERIAL DISTRIBUTOR
Filed Jan. 30, 1964   2 Sheets-Sheet 1
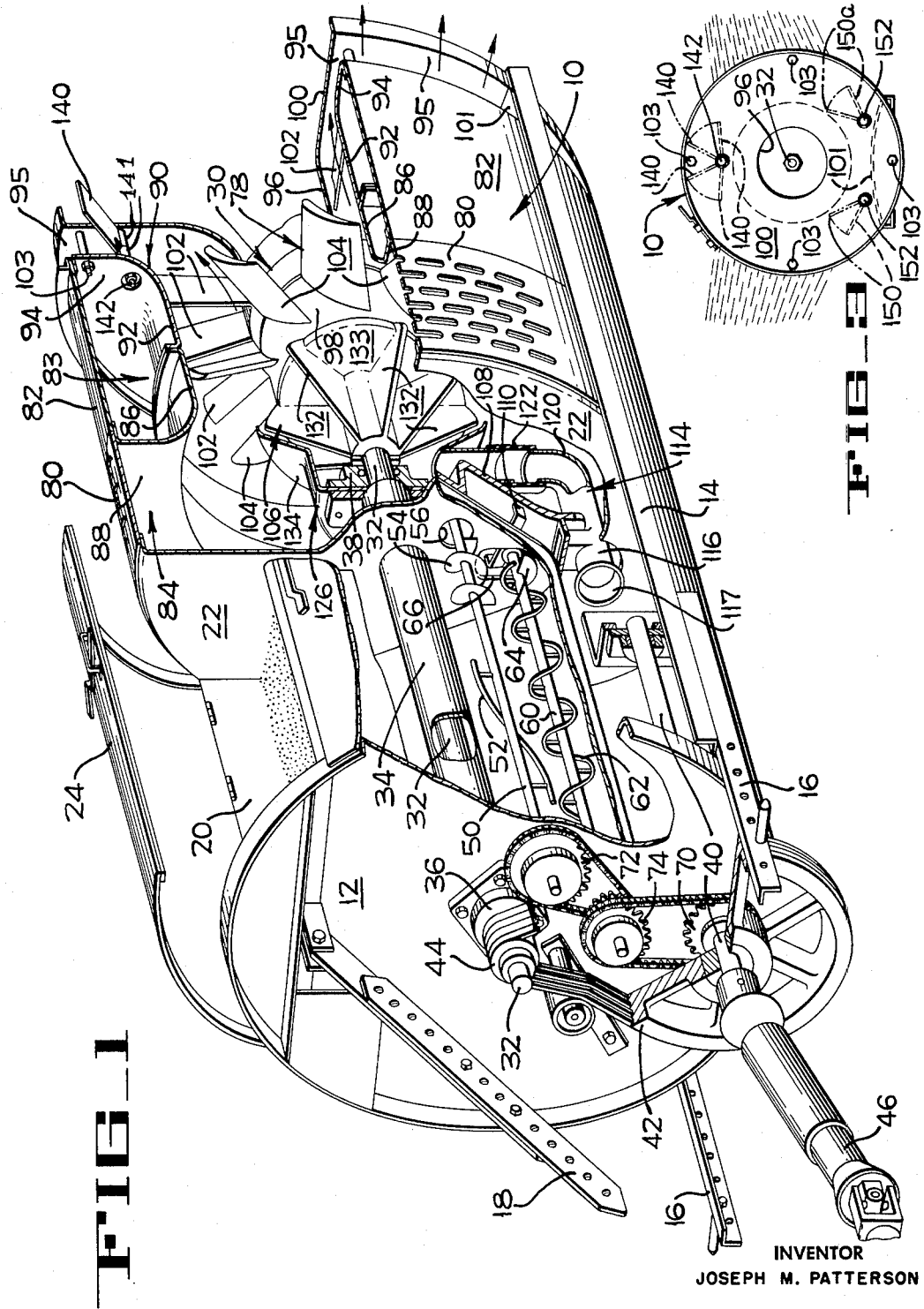
INVENTOR
JOSEPH M. PATTERSON
BY 
ATTORNEY

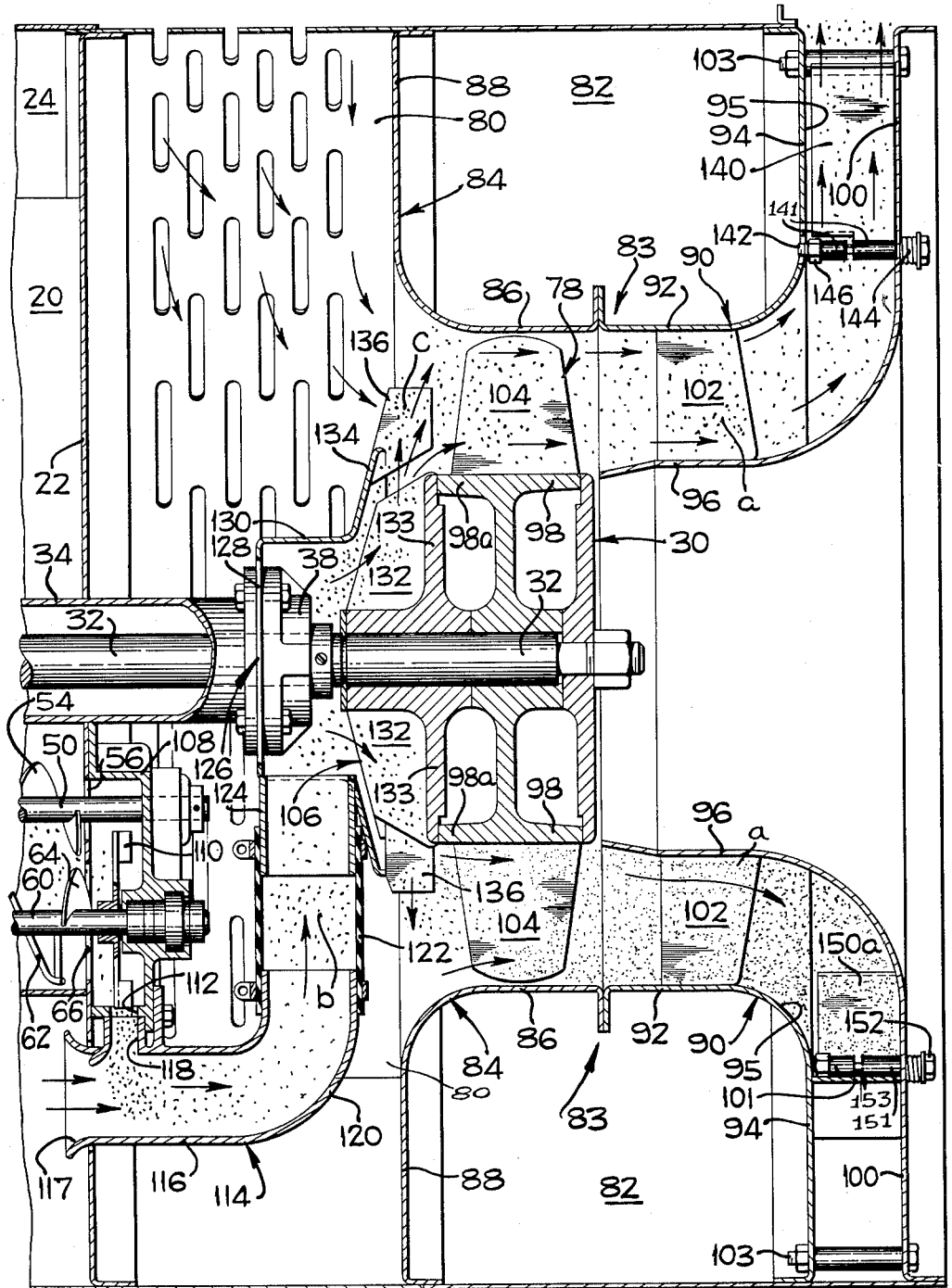
FIG_2

United States Patent Office 3,263,360
Patented August 2, 1966

3,263,360
POWDERED MATERIAL DISTRIBUTOR
Joseph M. Patterson, Winter Park, Fla., assignor to FMC Corporation, San Jose, Calif., a corporation of Delaware
Filed Jan. 30, 1964, Ser. No. 341,241
11 Claims. (Cl. 43—148)

This invention relates to apparatus for distributing powdered material, and more particularly to an agricultural duster for distributing a blast of air in which is entrained a dust or powder, such as a pesticide.

In agriculture it is often necessary to treat orchards or large plants, such a trees or shrubs, with an effective dosage of a pesticide in the form of a dust or powder. The dusters employed in this service are often relatively large, and in order to adequately cover the large plants or trees to be treated, require the delivery of a high volume, high velocity stream of air in which the pesticide or other powder is entrained and mixed. Because of the generation of this large volume, high velocity air blast, it is apparent that relatively large quantities of pesticide will be entrained and delivered with the air blast. Under these circumstances it is important from the standpoint of economy as well as effectiveness of treatment, that the dust be thoroughly and uniformly mixed in the air blast, so that there will be little waste, and no over-concentration at some zones and under-treatment in other zones of the treated areas. It is also desirable that the apparatus be capable of carrying a large quantity of dust, so that frequent refill operations need not be carried out. This, in turn, requires that a large hopper be provided, preferably a hopper which extends substantially the full depth of the apparatus, so that the bottom of the hopper is well below the axis of the fan elements used to create the air blast and distribute the dust.

It is an object of the present invention to efficiently utilize the dust that is delivered to a high volume dust distributor, such as an agricultural duster.

Another object is to effectively deliver dust to the hub zone of an axial flow fan which creates the main air blast, for distributing the air laden dust.

Still another object of the invention is to deliver the dust from the bottom of a hopper which is substantially below the axis of the fan.

It is an object of the present invention to create a main air blast by an axial flow fan with air entering from an annular zone which is outside the periphery of the fan, which air forms an axially extending, annular stream created by the axial flow fan. In this connection, this object includes the introduction of a radially flowing dust laden stream of air at the hub portion of the axial flow fan inside of the aforesaid annular stream of the main air blast.

Another object is to insure that the dust is well broken up and distributed as it is delivered to the main annular air blast, referred to above.

It is the object of the present invention to cause an auxiliary dust laden stream of air to have a radial component that intersects an annular, axially flowing main air blast, for delivery to the vegetation to be treated.

Another object is to provide a duster of the type described, wherein the circumferential extent of the outlet throat can be adjusted to provide for opposed, laterally flowing streams of dust laden air.

The manner in which these and other objects of the present invention may be attained will be apparent from the following detailed description of the invention and the accompanying drawings in which:

In the drawings:

FIG. 1 is a perspective of an agricultural duster embodying the invention, with parts broken away.

FIG. 2 is a fragmentary vertical section through the delivery end of the duster.

FIG. 3 is an end view of the duster on a reduced scale, showing the discharge deflector vanes.

The invention will be described as employed in an agricultural duster, although it will be recognized that in the broader aspects of the invention the use thereof is not limited to agricultural purposes. However, since the most important application of the invention now known is for agricultural use, and as mentioned, an agricultural machine will be described in detail.

The major elements of an agricultural duster embodying the invention are shown in FIGURES 1 and 2. The duster is mounted in a sectional cylindrical body indicated generally at 10, which has a forward end wall 12 and longitudinally extending bed irons 14. Conventional adjustable three point tractor hitch bars 16, 18 are provided at the forward end of the duster, so that the duster may be mounted directly on a farm tractor in the usual manner. This mounting is not critical to the invention, it is only shown as one example of how the duster can be transported. The duster could be mounted on a separate trailer, or on skids, and be pulled by a tractor or other vehicle, so long as power is available for the duster blower.

A large dust hopper is provided in the form of inverted generally V-shaped wall member 20, which occupies the forward portion of the duster. The forward end wall 12 forms one end of the hopper, and an intermediate end wall 22 forms the other end thereof. A loading door 24 of conventional design forms a portion of the sectional cylindrical body shell 10.

A combined centrifugal and axial flow fan 30 is mounted adjacent the delivery end of the duster, on a fan shaft 32. A tube 34 surrounds the fan shaft and extends between the forward wall 12 and the intermediate wall 22. An outboard bearing 36 is provided for the fan shaft 32 on the forward end wall 12. An inboard bearing 38 is provided for the fan shaft 32 on the rearward end of the tube 34. The fan shaft 32 is driven by a drive shaft 40 that is disposed beneath the hopper, and is journalled in the outboard wall 12, and at the intermediate wall 22. A multiple V-belt drive pulley 42 is mounted on the forward end of the drive shaft 40, and drives a multiple V-belt fan pulley 44 on the forward end of the fan shaft 32 by means of a conventional set of V-belts. A universal joint type power take off drive for connection to a power take off, such as those usually provided on farm tractors, is indicated at 46, details of which form no part of the invention, these drives being of well known and conventional design.

Means are provided for agitating the dust in the hopper, and for delivering the dust from the hopper for aspiration into the fan 30. The details of this agitator and feeder structure form no part of the invention and are described in detail in the patents to Funk 2,940,209, June 14, 1960, and Funk 2,975,543, March 21, 1961; assigned to the assignee of the present invention.

Referring to the dust agitator and feeder structure briefly, an upper agitator feed shaft 50 is provided, which carries a helical agitator bar 52, and mounts a helical feed screw 54 adjacent the intermediate end wall 22 for the hopper. The helical feed screw 54 delivers dust through a feed aperture 56, formed in the intermediate wall 22.

Similarly, a lower agitator and feed shaft 60 is provided, which carries a helical agitator bar 62, and a terminal helical feed screw 64. The feed screw 64 delivers dust through a feed aperture 66 in the intermediate wall 22. A feed drive chain sprocket 70 is mounted on the main drive shaft 40 inside of the fan drive pulley 42. Sprocket 70 drives a chain sprocket 72 mounted on the upper agitator shaft 50 and another chain drive sprocket 74 mounted on the lower agitator shaft 60.

The structure of the body of the duster at the fan area will now be described in detail. The fan assembly 30 includes an axial flow fan indicated generally at 78 and driven by the fan shaft 32. An annular perforated body shell section 80 is provided, which serves as the main air inlet. A cylindrical end body shell section 82 forms a continuation of the air inlet section 80. A two part shroud 83 is provided for surrounding the axial flow fan 78, which shroud has an inner end section 84 having a cylindrical portion 86 that surrounds the axial flow fan 78. The cylindrical shroud portion 86 joins with a recurved radial wall portion 88, that is connected to the body shell of the duster. The other section of the shroud 83 is in the form of an outer end shroud section 90, having a cylindrical portion 92 that forms a continuation of the cylindrical portion 86 of the shroud section 84. The cylindrical portion 92 of the shroud section 90 joins with a recurved radial wall portion 94, which is also connected to the body shell, and forms the inner wall of a dust laden air blast delivery throat 95.

In order to form an annular duct for the air blast laden with dust, a tubular casing or duct wall 96 extends from the hub portion 98 of the axial flow fan 78. The tubular duct wall 96 joins with a recurved radial wall extension 100 which forms an air turning head, and cooperates with the wall 94 previously described, to provide the delivery throat 95. A bottom closure plate 101 is provided at the lower portion of throat 95. A plurality of air blast straightening blades 102 extend between the inner duct wall 96 and the cylindrical portion 92 of the shroud section 90. In the apparatus being described, there are 12 blades 102 provided. The outer throat wall, or turning head 100 is joined to the inner throat wall 94 by spacer bolts 103. The axial flow fan blades of the axial flow fan 78 are indicated at 104, and project radially from the hub 98 of the fan. These blades are of conventional warped air foil design as indicated in FIG. 1, and in the apparatus being described the fan will incorporate seven blades 104.

The axial flow fan 78 creates the main air blast in the form of an axially moving annular stream of air. As indicated in FIG. 2, the air is drawn in through the perforations in the perforated shell portion 80 of the body shell by the fan blades 104, and is formed into the aforesaid axially flowing annular stream of air, which is confined first by a peripheral portion 98a of the fan hub 98 and the shroud 83, and then by the tubular casing or duct wall 96 and the shroud 83. This high velocity, high volume annular stream of air is indicated at "a" in FIG. 2. Before this stream of air leaves the fan blades 104 of the axial flow fan 78, the stream will have been charged with dust in the manner to be described presently. This dust laden stream flows rapidly out through throat 95, being turned by the radial air turning head or wall 100, previously described, through an angle of 90 degrees. The dust laden air then emerges from the throat 95 for distribution onto the desired vegetation.

The fan assembly 30, in addition to the axial flow fan 78, includes a centrifugal fan indicated generally at 106. This fan is mounted directly on the fan shaft 32 on the inlet side of the axial flow fan 78. The centrifugal fan 106 forms part of the dust aspiration structure, which will now be described in detail. On the outside of the intermediate wall 22 for the hopper is mounted a dust delivery casing 108, which also serves to journal the inner ends of the agitator and feed shafts 50 and 60, previously described. A paddle 110 is mounted on shaft 60, and is disposed within the dust delivery casing 108, for insuring that the dust falls through a dust feed port 112, formed in the bottom of the casing.

In order to aspirate the dust into the system, a right angle auxiliary air inlet tube, indicated generally at 114, is provided. The tube 114 has a longitudinally or axially extending section 116, formed with an inlet mouth or venturi 117, disposed below the dust hopper. The longitudinally extending section 116 of the tube has a vertical projection 118, which communicates with the dust feed port 112, in the dust delivery casing 108 previously described. There may be a dust delivery adjustment gate between the port 112 and the dust receiving projection 118, as described in the aforesaid Funk patents, but the details of this structure are not part of the present invention, and the gate is not shown.

The longitudinally extending tube section 116 connects with an elbow portion 120, to which is clamped a flexible hose 122, the other end of which is clamped to a vertically extending nipple 124 that depends from a dust guiding casing indicated generally at 126. Thus it can be seen that the auxiliary air inlet tube 114 includes a longitudinal and a vertical portion.

The dust guiding casing 126 has a cup shaped portion including a radial wall 128, that is mounted on the end of the tube 34 previously described, and a generally cylindrical wall 130 from which depends the nipple 124, just described. It will be noted that the cylindrical wall 130 of the dust guiding casing 126 terminates at an intermediate zone of the blades 132 of the centrifugal fan 106. It will also be seen that the centrifugal fan blades 132 connect to a radial flange 133 which extends radially from the shaft 32 to the hub flange 98*a* of the axial flow fan 78. A shallow conical skirt 134, which is generally radially extending, extends from the cylindrical wall 130 and overlies the outer portions of the blades 132 of the centrifugal fan 106. The skirt 134 terminates adjacent the inner ends of the blades 104 of the axial flow fan 78. In the apparatus being described there are provided six centrifugal fan blades 132.

A plurality of air straightening blades 136 project from the periphery of the skirt 134, upstream of the blades 104 of the axial flow fan 78. In the construction being described, nine air straightening blades 136 are provided. The diameter of the shell body 10 is 40 inches, in the example given.

As seen in FIGS. 2 and 3 deflector blades or vanes are adjustably mounted in the discharge throat 95 for shaping the emergent air blast. Two upper vanes 140 are hinged by half-hinge connections 141 on a clamp bolt 142, and are urged against wall 100 by a spring 144 and a nut 146. Two lower vanes 150, 150*a* are similarly mounted by half-hinge connections 151 on individual bolt assemblies 152, except that since the vanes 150, 150*a* are individually mounted on half hinge connections, spacer sleeves 153 are employed at each bolt. To adjust the discharge pattern, the operator manually grasps the vanes, and adjusts them against the frictional clamping force between the blades and the outer wall 100.

In operation, the axial flow fan 78 creates a high volume, high velocity air blast in the form of a annular axially moving stream of air "*a*" previously described, and indicated in FIG. 2. This stream of air flows through the duct formed by shroud 83 and tubular casing 96, and is turned or deflected by the wall 100. The blast is emitted from throat 95 as a radial sheet of air, throughout whatever degree of arc is determined by the adjustable deflector blades 140, 150 and 150*a*. The bottom closure plate 101 for the throat 95 prevents dust laden air from impinging against the ground.

At the hopper, dust is deposited into the extension 118 of the auxiliary air inlet tube 114, whereupon it is entrained in a stream of air aspirated through the venturi mouth 117. This stream of dust laden air indicated at "*b*" (FIG. 2) impinges against the blades 132 of the centrifugal fan 106. The dust guiding casing 126 insures that the dust laden auxiliary stream of air "*b*" will reach the blades 132 of the centrifugal fan. The centrifugal fan transforms this dust laden auxiliary stream of air into a generally radially flowing sheet of dust laden air indicated at "c." This sheet of dust laden air "c" impinges upon and intersects the axially flowing annular stream of air "a" engendered by the axial flow fan 78. The air straightening blades 136 on skirt 134 assists in this action, and the blades 132 of the centrifugal fan 106 also assist in thoroughly mixing the dust with the aspirated air, before it is introduced into the main stream of air to form the annular stream of dust laden air in the duct, indicated at "a" in FIG. 2. Thus the blast of air that is emitted from the throat 95 as just described, is thoroughly mixed with dust for depositing the dust or pesticide upon the vegetation under treatment.

It can be seen that since the inlet mouth 117 of the auxiliary air inlet tube 114 can be placed beneath the hopper, the hopper can hold a relatively large amount of dust, namely, several hundred pounds of the material. This material, due to the cooperation of the centrifugal fan with the axial flow fan is thoroughly mixed in a high velocity high volume annular stream of air which is turned as described, and deposited on the vegetation.

Having described the invention in detail so that those skilled in the art may practice the same, I claim:

1. A powdered material distributor comprising an axial flow impeller having a hub and blades projecting radially from said hub, a centrifugal impeller on the inlet side of said hub and having a diameter not substantially greater than that of the hub, a shroud surrounding said impellers for providing a main air inlet duct and a discharge duct for the air and powdered material, a powdered material guiding casing opening axially toward the inlet side of said centrifugal impeller, auxiliary air inlet tube means connected to said casing, and means for introducing powdered material to said tube means.

2. The distributor of claim 1, wherein said material guiding casing is formed with a generally cylindrical wall that confronts an intermediate portion of the blades of said centrifugal impeller, and a skirt projects radially outward from said casing wall and terminates adjacent the inner ends of the blades of said axial flow impeller.

3. The distributor of claim 2, wherein a plurality of circumferentially spaced air straightening blades project radially from the skirt of said material guiding casing.

4. The distributor of claim 2, wherein the portion of said auxiliary air inlet tube that connects to said material guiding casing is generally radial, and connects to the lower portion of said generally cylindrical casing wall.

5. An agricultural duster comprising a dust hopper, a cylindrical shell projecting rearwardly of said hopper, an axial flow impeller within said shell and having a hub with blades projecting radially from said hub, a centrifugal impeller on the inlet side of said hub and having a diameter not substantially greater than that of the hub, a shroud within said shell and having a cylindrical portion of smaller diameter than that of the shell, the cylindrical portion of said shroud surrounding said impellers for providing a main discharge duct for air and dust, a dust guiding casing opening axially toward the inlet side of said centrifugal impeller, a bent auxiliary air inlet tube having an axial portion below said hopper and a radial portion connected to said material guiding casing, and means for introducing dust from said hopper to the inlet end of the axial portion of said tube.

6. The duster of claim 5, wherein said shroud has a radial wall at its delivery end that extends to said shell, a tubular duct wall extends rearwardly from said axial flow impeller hub and terminates in a generally radial wall that is axially spaced from the radial end wall of said shroud, and vanes extending radially between said tubular duct wall and the cylindrical portion of said shroud.

7. The duster of claim 6, wherein said shell includes a perforated portion that extends between said hopper and the inlet end of said shroud for serving as the main air inlet.

8. The duster of claim 6, wherein said dust guiding casing is formed with a generally cylindrical wall that confronts an intermediate portion of the blades of said centrifugal impeller, and a skirt projects radially outward from said casing wall and terminates adjacent the inner ends of the blades of said axial flow impeller.

9. An agricultural duster comprising a dust hopper, a cylindrical shell projecting rearwardly of said hopper, an axial flow impeller within said shell and having a hub with radial blades, a shroud within said shell and having a cylindrical portion of smaller diameter than that of said shell, the cylindrical portion of said shroud surrounding said impeller, said shroud having forward and rearward radial walls extending to said shell at each end of the cylindrical shroud portion, a tubular duct wall extending rearwardly from said axial flow impeller hub and terminating in a generally radial wall that is axially spaced from said rearward shroud radial wall for forming a radial delivery throat, said tubular duct wall and said shroud, respectively having recurved junctions for their respective supports, a wall extending laterally across the lower portion of said throat, a pair of angularly adjustable deflector vanes for blocking the upper portion of said throat, and means for introducing a dust laden stream of air generally radially outwardly into the axially flowing main stream of air produced by said axial flow impeller and upstream of said impeller blades.

10. The duster of claim 9, wherein a second pair of anguarly adjustable deflector vanes is mounted just above said lower lateral wall.

11. A powdered material distributor comprising an axially extending cylindrical shroud and an axial flow impeller within said shroud for providing a high velocity, axially flowing annular stream of air, fan means for introducing a substantially angularly continuous sheet of radially outwardly flowing, powdered material laden air into a radially inner zone of said axially flowing annular stream of air and upstream of said axial flow impeller, and deflector means downstream of said axial flow impeller for directing said axially flowing annular stream of air in a generally radial direction.

References Cited by the Examiner

UNITED STATES PATENTS

| 2,608,441 | 8/1952 | Daugherty | 43—148 X |
| 2,674,494 | 4/1954 | Matteson et al. | 43—148 X |
| 2,692,454 | 10/1954 | Wright et al. | 43—148 |
| 2,770,070 | 11/1956 | Funk | 43—148 |
| 2,940,209 | 6/1960 | Funk | 43—148 |

References Cited by the Applicant

UNITED STATES PATENTS

| 1,785,932 | 12/1930 | Brown et al. |
| 2,692,454 | 10/1954 | Wright et al. |

ANTONIO F. GUIDA, *Acting Primary Examiner.*

S. KOREN, *Examiner.*

R. L. HOLLISTER, *Assistant Examiner.*